(12) United States Patent
Aldehayyat

(10) Patent No.: US 10,312,713 B2
(45) Date of Patent: Jun. 4, 2019

(54) POWER DISTRIBUTION CONTROLLER

(71) Applicant: Microsoft Technology Licensing, LLC, Redmond, WA (US)

(72) Inventor: Yazan Aldehayyat, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 311 days.

(21) Appl. No.: 15/248,593

(22) Filed: Aug. 26, 2016

(65) Prior Publication Data

US 2018/0062395 A1    Mar. 1, 2018

(51) Int. Cl.
*G06F 1/324* (2019.01)
*H02J 7/00* (2006.01)
*G06F 1/16* (2006.01)
*G06F 1/26* (2006.01)
*G06F 1/28* (2006.01)
*G06F 1/3212* (2019.01)

(52) U.S. Cl.
CPC ............ *H02J 7/008* (2013.01); *G06F 1/1635* (2013.01); *G06F 1/263* (2013.01); *G06F 1/28* (2013.01); *H02J 7/0054* (2013.01); *H02J 7/0068* (2013.01); *G06F 1/324* (2013.01); *G06F 1/3212* (2013.01)

(58) Field of Classification Search
USPC .................................. 307/24, 31, 39, 52, 66
See application file for complete search history.

(56) References Cited

U.S. PATENT DOCUMENTS

| 7,663,602 | B2 | 2/2010 | Jones et al. |
| 8,909,838 | B2 | 12/2014 | Hsu et al. |
| 8,934,219 | B2 | 1/2015 | Gartrell et al. |
| 9,176,536 | B2 | 11/2015 | Kerr |
| 9,184,604 | B2 | 11/2015 | Chou et al. |
| 9,337,661 | B2 | 5/2016 | Coakley et al. |
| 2003/0112585 | A1 | 6/2003 | Silvester |
| 2003/0198008 | A1 | 10/2003 | Leapman et al. |
| 2006/0072287 | A1 | 4/2006 | Kwong et al. |
| 2012/0173902 | A1 | 7/2012 | Zawacki et al. |
| 2013/0038297 | A1 | 2/2013 | Sang et al. |

(Continued)

FOREIGN PATENT DOCUMENTS

| CN | 103855763 A | 6/2014 |
| WO | 2007134144 A2 | 11/2007 |
| WO | 2014109789 A1 | 7/2014 |

OTHER PUBLICATIONS

"2 in 1 Laptops+ Tablet Fun by Intel", Published on: Jan. 9, 2016 Available at: http://www.intel.com/content/www/us/en/2-in-1/laptop-tablet.html.

*Primary Examiner* — Danny Nguyen

(74) *Attorney, Agent, or Firm* — Holzer Paten Drennan

(57) ABSTRACT

The described technology includes a power distribution controller configured to control functioning of a first power source configured to supply power to a first component and to a second component and a second power source configured to supply power to the second component. The power distribution controller sets an upper limit of current from the first power source to the second component based on average level of charge at the second power source over a predetermined amount of time. The power distribution controller reduces the amount of power loss due to spikes in current from the first power source to the second component.

19 Claims, 8 Drawing Sheets

(56) References Cited

U.S. PATENT DOCUMENTS

| | | |
|---|---|---|
| 2014/0118930 A1 | 5/2014 | Sedon |
| 2014/0268556 A1* | 9/2014 | Lam .................. G06F 1/1632 361/679.55 |
| 2015/0036273 A1 | 2/2015 | Hui et al. |
| 2015/0340897 A1* | 11/2015 | Uan-Zo-Li ............ H02J 7/0054 320/103 |
| 2016/0202742 A1* | 7/2016 | He ..................... G06F 1/263 713/2 |
| 2017/0063123 A1* | 3/2017 | Horie .................. H02J 7/0054 |

* cited by examiner

POWER DISTRIBUTION CONTROLLER

BACKGROUND

Electronic devices may use one or more power sources to provide power to different components therein. For example, a laptop computer may have a battery in the base component housing a keyboard and a battery in the top component including a screen. The base power source may generally provide power to the base component. However, a power bus between the base component and the top component may be provided that can be used by the top component to draw power from the base component.

SUMMARY

The described technology includes a power distribution controller configured to control functioning of a first power source configured to supply power to a first component and to a second component and a second power source configured to supply power to the second component. The power distribution controller sets an upper limit of current from the first power source to the second component based on average level of charge at the second power source over a predetermined amount of time. The power distribution controller reduces the amount of power loss due to spikes in current from the first power source to the second component.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

The technology disclosed herein includes a power distribution controller configured to control functioning of a first power source configured to supply power to a first component and to a second component and a second power source configured to supply power to the second component. The power distribution controller sets an upper limit of current from the first power source to the second component based on average level of charge at the second power source over a predetermined amount of time. The power distribution controller reduces the amount of power loss due to spikes in current from the first power source to the second component.

Figure 1:
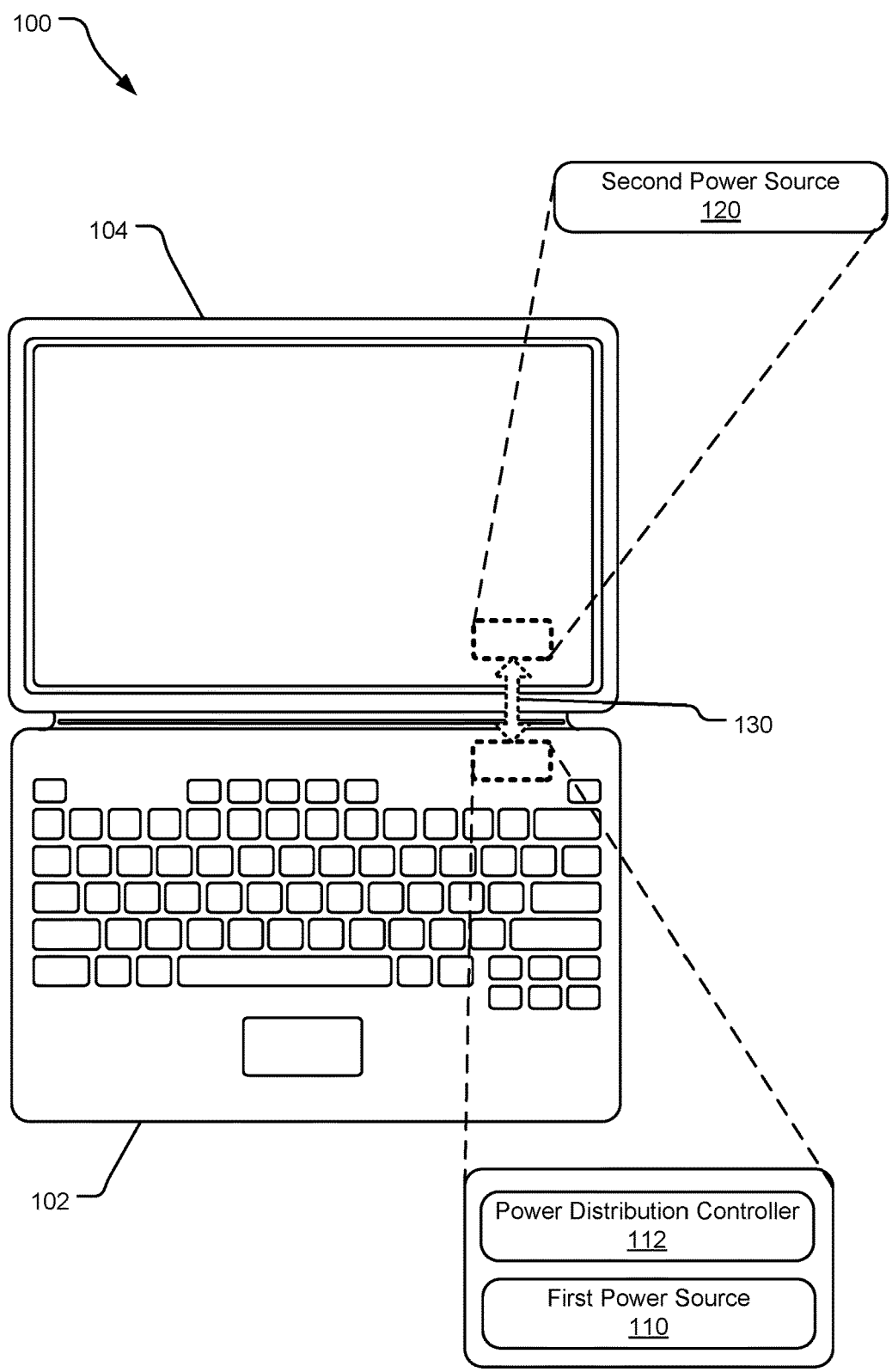
FIG. 1 illustrates an example computing system including a power distribution controller disclosed herein.

FIG. 1 illustrates a system 100 including a power distribution controller disclosed herein. The system 100 may be a laptop, a desktop, a tablet connected with a keyboard, or any other device that uses multiple power sources. The system 100 may include a base 102 and a top 104. The base 102 may include various components such as a motherboard that is connected to a microprocessor, memory, various communication buses, keyboard, tracking pad, universal service bus (USB) ports, etc. The top 104 may include a screen that is configured to display content as well as receive input from users, a camera, etc. In the illustrated implementation, the base 102 includes a first power source 110 and a power distribution controller 112, whereas the top 104 includes a second power source 120. The first power source 110 and the power distribution controller 112 may be connected to the second power source 120 via a power bus 130. In one implementation, the power bus 130 may be used to provide power between the first power source 110 and the top 104 as well as to communicate one or more signals from the power distribution controller 112 to the second power source 120.

In one implementation of the system 100, the first power source 110 is configured to supply power to the base 102 and the second power source 120 is configured to supply power to the top 104. Furthermore, the first power source 110 may also provide power to the top 104. Specifically, the system 100 may be configured such that when the charge on the second power source 120 is low, the first power source 110 may provide power to the top 104. Furthermore, when the charge on the second power source 120 is low, the first power source 110 may also charge the second power source 120.

Charging the second power source 120 from the first power source 110 and/or providing power to the top 104 from the first power source 110 result in current being sent through the power bus 130. If the requests for providing power by the first power source 110 to the top 104 and/or to the second power source 120 are not managed, such requests may result in sporadic spikes of high level current flowing through the power bus 130. Because the power loss resulting from current transmission is a quadratic function of current, such spikes of high level current flowing through the power bus 130 result in higher levels of power losses.

The system 100 uses the power distribution controller 112 to manage the power sent from the first power source 110 via the power bus 130. In one implementation, the power distribution controller 112 determines the power sent from the first power source 110 via the power bus 130 based on an average level of charge at the second power source 120 over a predetermined amount of time. For example, the power distribution controller 112 may monitor the charge level at the second power source 120 over a period of two minutes and determine the average level of charge (or state of charge (SOC)) at the second power source 120. In one implementation, the power distribution controller 112 may monitor capacity level of the SOC at the second power source 120 as a percentage of the capacity (between zero and one hundred percentages). Alternatively, the power distribution controller 112 may monitor the actual level of charge (such as available ampere-hours, watt-hours, KWatt-hours) at the second power source 120.

In one implementation of the system 100, the power distribution controller 112 may include a charge level measurement module that measures the charge at the second power source 120 at pre-determined intervals and stores the measured values in temporary storage such as RAM or registers on the power distribution controller 112. The power distribution controller 112 may also include an average determination module that determines the average level of charge at the second power source 120 over such predetermined time period and updates such average at predetermined time intervals. For example, the average charge level over a period of ten minutes may be updated at every minute.

The power distribution controller 112 may set an upper current draw limit (also referred to as the upper current limit or the upper draw limit) based on the average charge level of the second power source 120. For example, the upper current limit CL[t] at any given time t may be set as a function of the upper draw limit CL[t−1] at a time period preceding the time period t and a term delta$_{SOC}$ proportional to a percentage change in the charge level at the second power source 120 over a predetermined time period, as provided by Equation 1 below:

$$CL[t] = -K(\text{delta}_{SOC}) + CL[t-1] \qquad \text{Eq. 1}$$

Here, the term K is proportional constant that may be determined empirically. Delta$_{SOC}$ is the percentage change in the power level of the second power source 120 over a predetermined time of, for example, two minutes. In one implementation, delta$_{SOC}$ may be determined as the difference between a predetermined power level at the second power source 120 and the actual power level at the second power source 120. Thus, if the predetermined power level is 50% and the actual power level is 49%, the value of delta$_{SOC}$ is 1%.

While in the illustrated implementation, K is proportional constant, in an alternative implementation, the upper current limit CL[t] may be determined using some function of the percentage change in charge level at the second power source 120 over a predetermined time period. For example, as illustrated below by equation 2, CL[t] may be based on alternative form of feedback based on delta$_{SOC}$, the percentage change in charge level at the second power source 120 over a predetermined time period, such as an integral feedback, a differential feedback, a lagged feedback, or a logarithmic feedback.

$$CL[t] = \Omega(\text{delta}_{SOC}) + CL[t-1] \qquad \text{Eq. 2}$$

Wherein $\Omega$ represents a function that may be an integral function, a differentiation function, a log function, or a quadratic function. For example, the function $\Omega$ may be determined empirically. Thus, if $\Omega$ is an integral function, the value of delta$_{SOC}$ may be integrated over a period of time and the resulting integral value may be added or subtracted from CL[t−1]. Alternatively, $\Omega(\text{delta}_{SOC})$ may be represented as $K_p e(\tau)$, $K_i \int_0^t e(\tau) d\tau$, or $$K_d \frac{de(\tau)}{d\tau},$$

where $\tau$ being delta$_{SOC}$, and $K_p$, $K_i$, and $K_d$ being predetermined constants.

Furthermore, while the illustrated implementation determines delta$_{SOC}$ as a percentage difference between a predetermined power level at the second power source 120 and the actual power level at the second power source 120, in an alternative implementation, delta$_{SOC}$ may be determined based on other methods. For example, delta$_{SOC}$ may be based on historic values of power level at the second power source 120. Thus, delta$_{SOC}$ may be the difference between a predetermined power level at the second power source 120 and an average of power level at the second power source 120 over a predetermined historic time period, such as 24 hours.

Given that the first term in equation 1 above is negative (alternatively, the value of K may be negative), if the delta$_{SOC}$ is positive, it results in the CL[t] being lower compared to CL[t−1]. However, if delta$_{SOC}$ is negative, it results in the CL[t] being lower compared to CL[t−1]. Thus, if the current charge level on the second power source 120 is lower than the desired charge level, the resulting negative delta$_{SOC}$ results in higher current being applied to the second power source 120. On the other hand, if the current charge level on the second power source 120 is higher than the desired charge level, the resulting positive delta$_{SOC}$ results in lower current being applied to the second power source 120.

Figure 2:
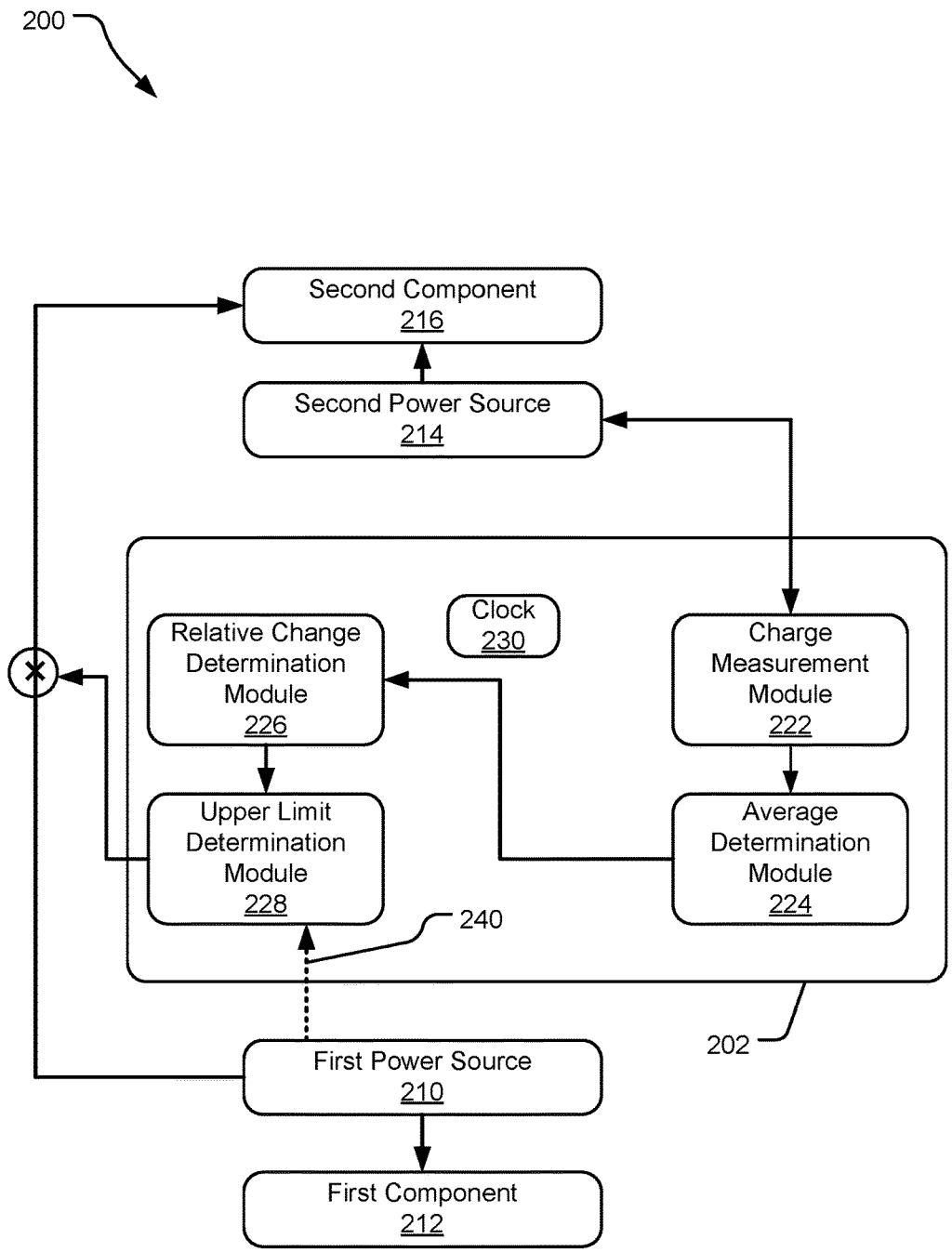
FIG. 2 illustrates an example system including a power distribution controller disclosed herein.

FIG. 2 illustrates a system 200 including a power distribution controller disclosed herein. Specifically, the system 200 includes a power distribution controller 202 operating with a first power source 210 located with a first component 212 and a second power source 214 located with a second component 216. For example, the second component 216 may be a detachable attachment, such as a display device, to the first component 212, such as a base of a laptop.

In one implementation, the first power source 210 powers the first component 212 and the second power source 214 powers the second component 216. The power distribution controller 202 discloses an implementation where, if the charge level at the second power source 214 is low, the first power source 210 may be used to charge the second power source 214 as well as to provide power to the second component 216. However, in another alternative implementation, the reverse capability may be provided such that, if the charge level at the first power source 210 is low, the second power source 214 may be used to charge the first power source 210 as well as to provide power to the first component 212.

The power distribution controller 202 includes a charge measurement module 222 that measures the level of charge at the second power source 214. In one implementation, the measured value may be digitized and stored in one or more registers. An average determination module 224 uses the measured value of the charge over a predetermined time period to determine the average charge level. In an alternative implementation, one or more moving average filters may be used to average an analog output value from the charge measurement module. The average determination module 224, and various other components of the power distribution controller 202 may us clock signal from a clock 230.

A relative change determination module 226 may determine the change in the charge level at the second power source 214. The relative change determination module 226 may take a desired charge level and compare it to the average charge level to determine the relative change in the charge level at the second power source 214. In one example, if the desired charge level at the second power source 214 is 50% and the actual charge level is 49%, the relative change determination module 226 generates an output of 1%.

An upper limit determination module 228 uses the output of the relative change determination module 226 to control a current level from the first power source 210 to the second component 216 and to the second power source 214. For example, the upper limit determination module 228 may also use a value 240 of current level CL from the first power source 210 at time t−1 (CL[t−1]) to determine the value of the current level at time t (CL[t]) using the relation disclosed above in equation 1.

Figure 3:
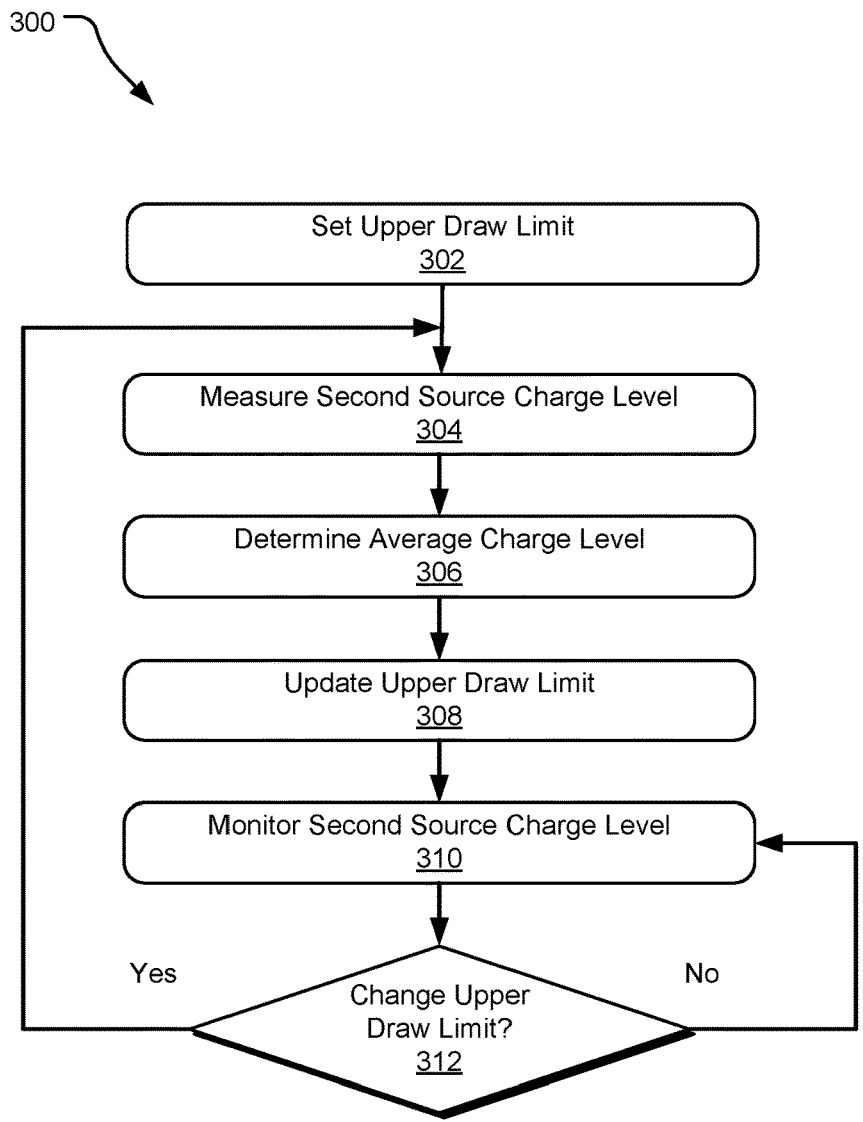
FIG. 3 illustrates example operations of the power distribution controller disclosed herein.

FIG. 3 illustrates operations 300 of the power distribution controller disclosed herein. An operation 302 sets an initial value of upper limit on the current drawn from a first power source to a second power source. An operation 304 measures a charge level at the second power source. An operation 306 determines the average charge level at the second power source over a predetermined time period. An operation 308 uses the average charge level determined at operation 306 to update the upper draw limit of the current from the first power source to the second power source. An operation 310 monitors the charge level at the second power source and an operation 312 determines change in the upper limit in the current drawn from the the first power source to the second power source.

Figure 4:
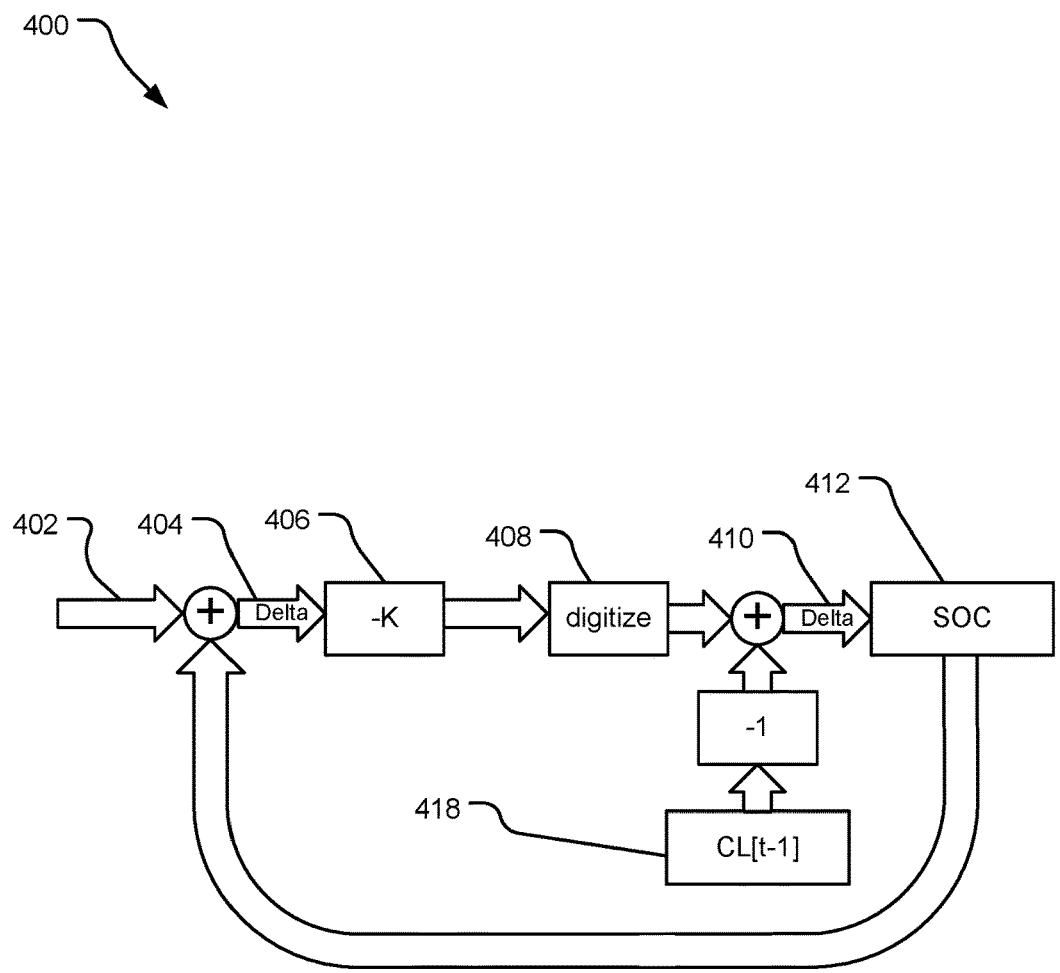
FIG. 4 illustrates an example operating framework of the power distribution controller disclosed herein.

FIG. 4 illustrates an operating framework 400 of the power distribution controller disclosed herein. At 402 a desired value of charge level at a second power source is determined. The desired value is subtracted from the current value of the charge at the second power level as illustrated by SOC 412 to generate a difference $delta_{SOC}$ 404. The difference $delta_{SOC}$ 404 is multiplied by a constant K 406, which may be set empirically. In one implementation, the output of the multiplication is digitized at block 408. The current value CL[t−1] 418 of current drawn by the second power source is subtracted from the output of the digitizer 408 to generate a delta 410 that is used to set the current level drawn by the second power source from the first power source.

Figure 5:
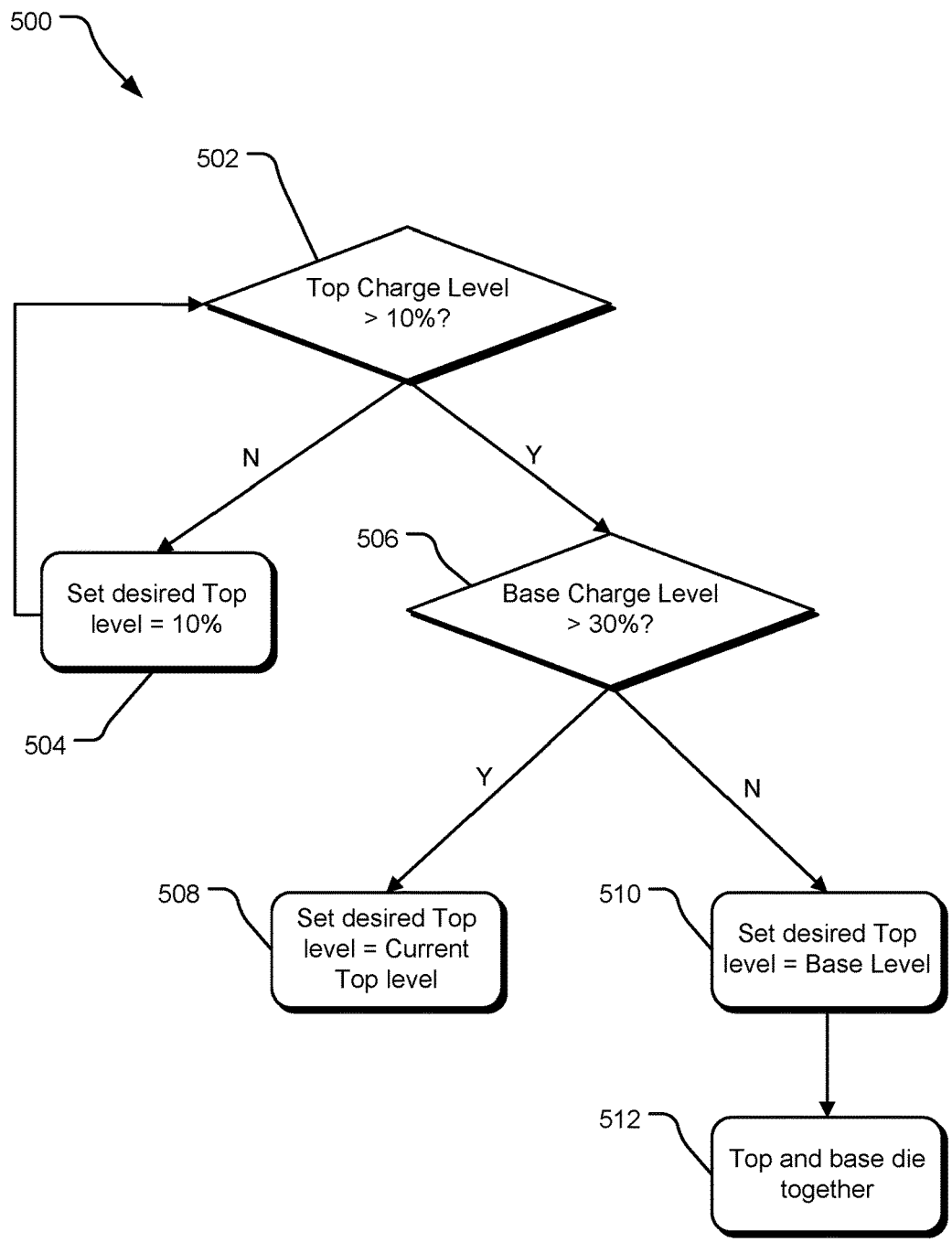
FIG. 5 illustrates an example logical framework of the power distribution controller disclosed herein.

Referring to FIG. 5, it illustrates a logical framework 500 of the power distribution controller disclosed herein. Specifically, the logical framework is used to set the current level of a top power source in an apparatus that has a top power source and a base power source. At the block 502 the charge level of the top power source is compared to a predetermined charge level of ten percent. If the charge level is lower than ten percent, at operation 504, the desired charge level at the top power source is set to ten percent. If the charge level is equal to or higher than ten percent, at an operation 506, a charge level of a base power source is compared to a predetermined charge level of 30%.

If the base charge level is above 30% an operation 508 sets the desired charge level of the top power source to a current charge level of the top power source. If the base charge level is not above 30% an operation 510 sets the desired charge level of the top power source to the charge level of the base power source. In this case, at an operation 512, both the top power source and the bottom power source will completely discharge substantially together.

The Operations disclosed in FIGS. 4 and 5 together ensures that once the desired power level of the top power source is set, a feedback loop manages the power levels of the top power source and the bottom power source such that they both will discharge completely, substantially at the same time. Specifically, if the charge level of the top power source falls below the desired level of ten percent, the current draw by the top power source from the bottom power source is increased. On the other hand, if the charge level of the top power source is above a desired charge level, the current drawn by the top power source from the bottom power source is decreased. In effect, as a result of these operations, the charge level of the top power source is maintained at the desired level until the charge level of the base power source is at least 30%. Once the charge level of the base power source is at 30%, the charge level of top power source tracks the charge level of the base power source. On the other hand, if the charge level of the top power source is below ten percent, the top power source is charged by drawing current from the bottom power source.

Figure 6:
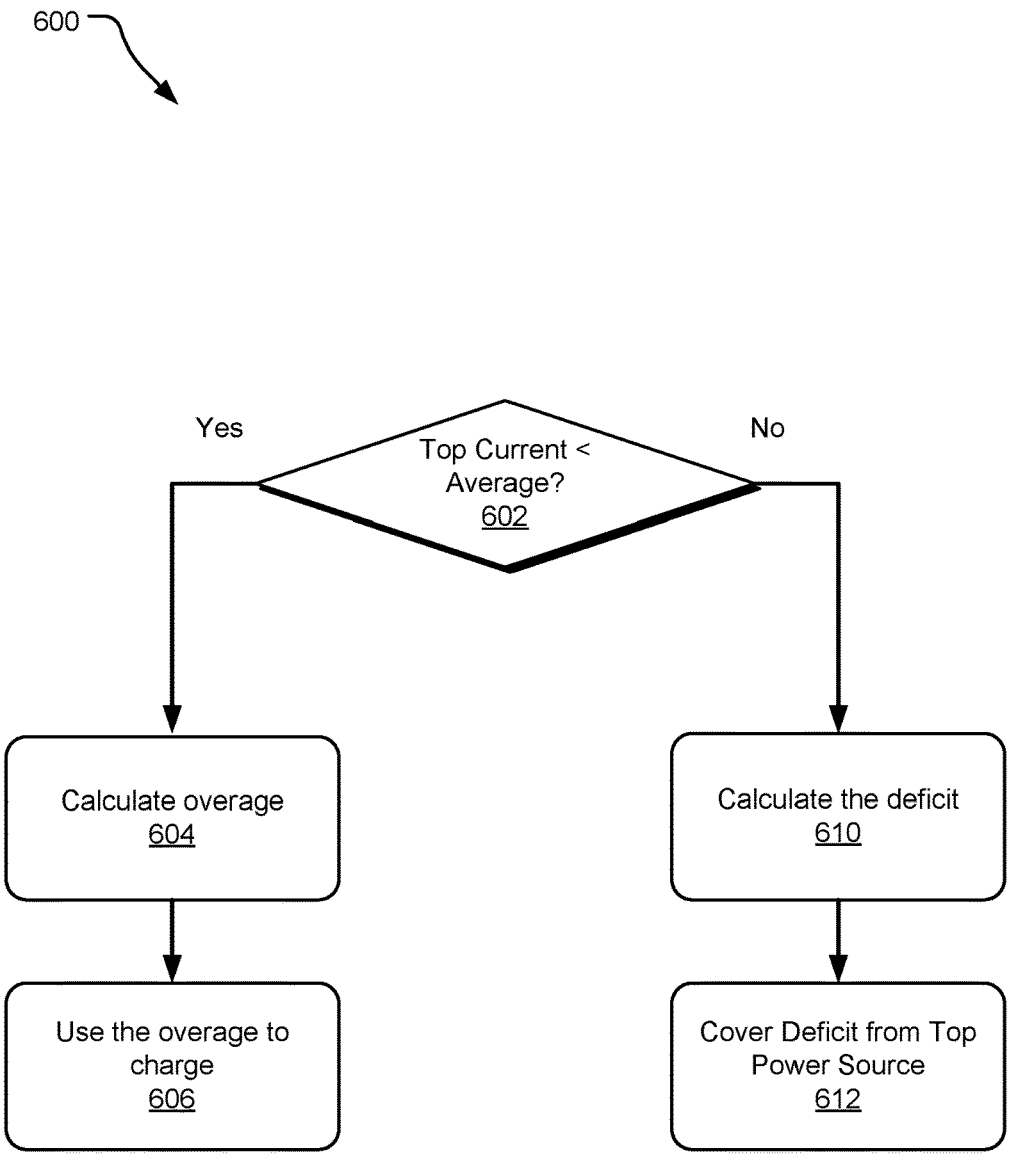
FIG. 6 illustrates an example operations of the power distribution controller disclosed herein.

FIG. 6 illustrates operations 600 of the power distribution controller disclosed herein. Specifically, the operations 600 are used to manage the current draw from a top component from a base power source of a device having a top power source and a bottom power source. Specifically, the operations 600 allows the top power source to be used as a bypass capacitor so that any spikes in current between the top component/top power source and a base power source are reduced.

An operation 602 compares current draw by the top component from the base power source to an average current draw by the top component from the base power source. If the current draw is less than average, the difference (overage) is calculated at operation 604 and an operation 606 uses the overage to charge the top power source. Thus, in effect, when the top component is requiring less current, use the difference to charge the top power source. If the current draw by the top is above average, an operation 610 calculates the deficit and covers such deficit from the top source, which may be charged over time as by the operation 606. The operations 600 are further illustrated by state diagrams of FIG. 7 below.

Figure 7:
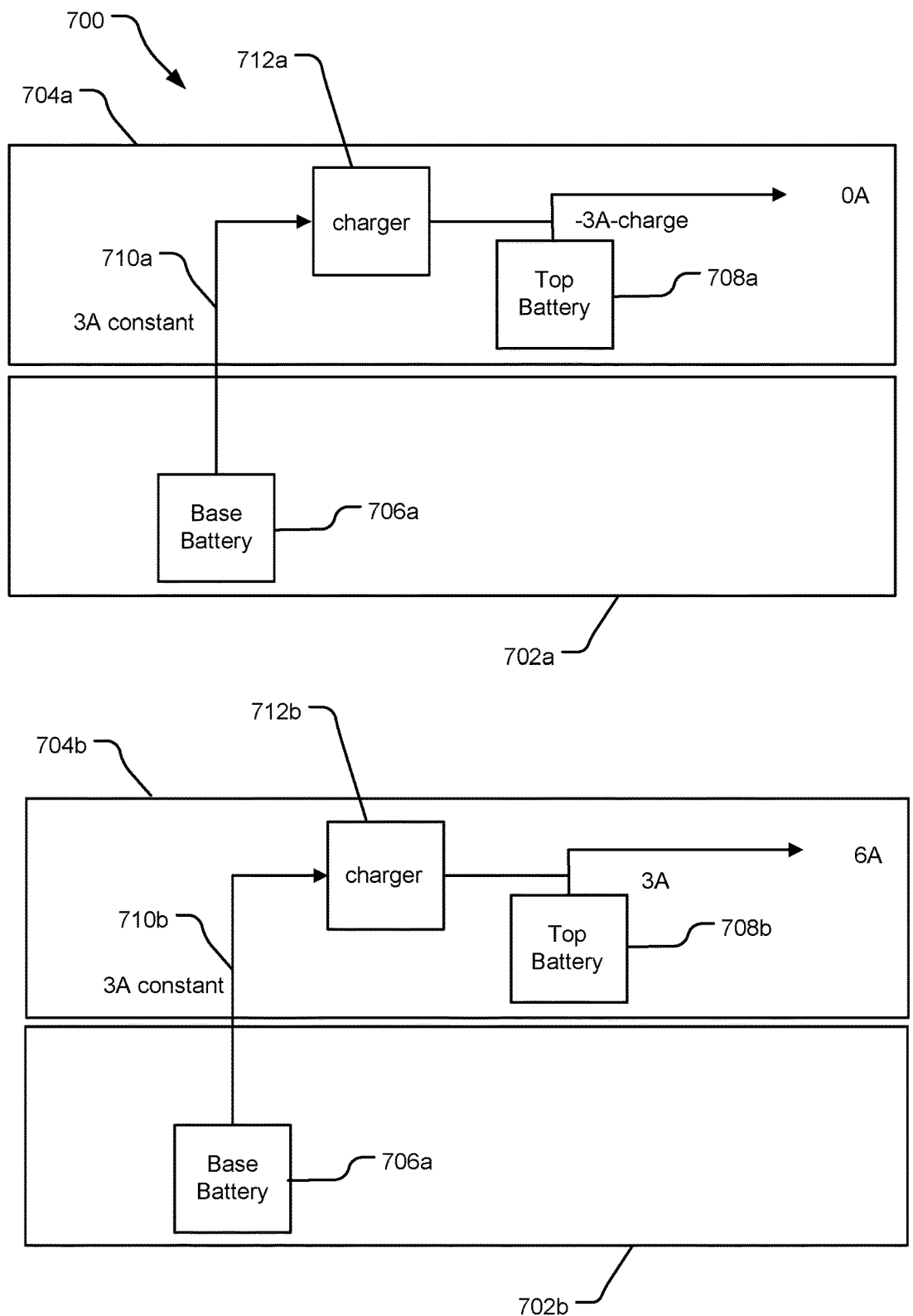
FIG. 7 illustrates example implementation states of the power distribution controller disclosed herein.

Specifically, FIG. 7 illustrates states 700 of an apparatus having a base component 702a, 702b having a base power source 706a, 706b, and a top component 704a, 704b having a top power source 708a, 708b. Current 710a, 710b represents current drawn by the top component 704a, 704b from a bottom power source 706a, 706b. Operating an apparatus with the states 700 allows reducing spikes in the current 710a, 710b, resulting in reduced power losses. In the illustrated implementation, the average value of the current 710a, 710b is shown as being maintained substantially equal to 3 amperes.

Specifically, if the top component 704a is drawing less current (in this case zero) than the average of 3 amperes, the −3A overage resulting from the current 710a is shown as charging the top power source 708a via the charger 712a. When the top component 704b is drawing more current (6 amperes) than the average of 3 amperes, the top power source 708a provides additional 3 amperes to supplement the 3 amperes of current 710b via the charger 712b. As a result of this arrangement, the level of current 710a, 710b is kept substantially constant at 3 amperes, reducing the spikes from 0 amperes to 6 amperes. As a result, the power losses from the current 710a, 710b, which are quadratic, are substantially reduced.

Figure 8:
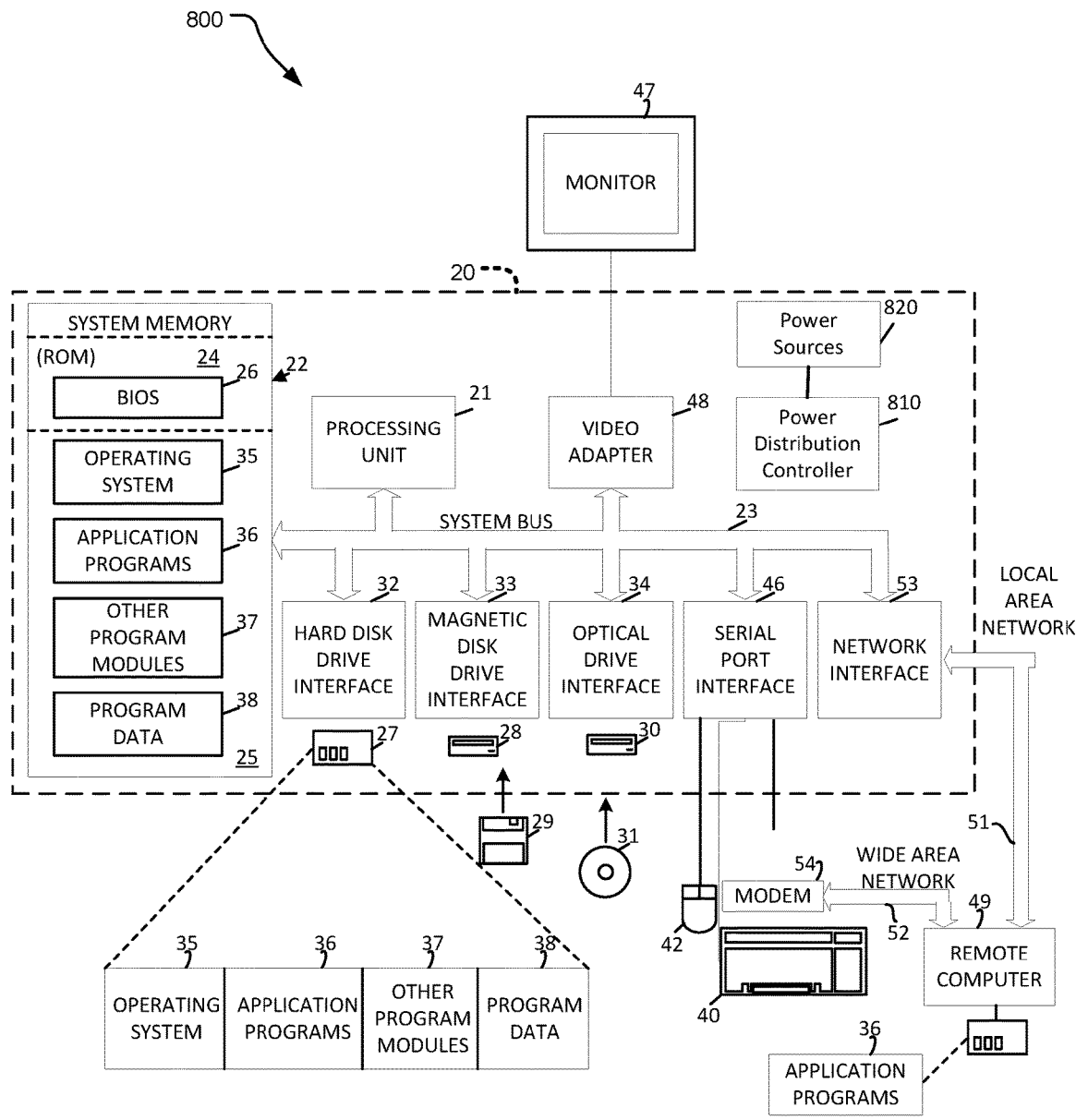
FIG. 8 illustrates an example system that may be useful in implementing the power distribution controller disclosed herein.

FIG. 8 illustrates an example system 800 that may be useful in implementing the power distribution controller disclosed herein. The example hardware and operating environment of FIG. 8 for implementing the described technology includes a computing device, such as a general purpose computing device in the form of a computer 20, a mobile telephone, a personal data assistant (PDA), a tablet, smart watch, gaming remote, or other type of computing device. In the implementation of FIG. 9, for example, the computer 20 includes a processing unit 21, a system memory 22, and a system bus 23 that operatively couples various system components, including the system memory 22 to the processing unit 21. There may be only one or there may be more than one processing units 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 800, the computer 20 also includes a power distribution controller 810, such as the power distribution controller disclosed herein. The power distribution controller 810 may communicate with power sources 820 to control the level of power provided by the power sources 820.

The system bus 23 may be any of several types of bus structures, including a memory bus or memory controller, a peripheral bus, a switched fabric, point-to-point connections, and a local bus using any of a variety of bus architectures. The system memory 22 may also be referred to as simply the memory, and includes read-only memory (ROM) 24 and random access memory (RAM) 25. A basic input/output system (BIOS) 26, contains the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement a power distribution controller disclosed herein. In one implementation, a frequency unwrapping module, including instructions to unwrap frequencies based on the sampled reflected modulations signals, may be stored in memory of the computer 20, such as the read-only memory (ROM) 24 and random access memory (RAM) 25, etc.

Furthermore, instructions stored on the memory of the computer 20 may be used to generate a transformation matrix using one or more operations disclosed in FIG. 5. Similarly, instructions stored on the memory of the computer 20 may also be used to implement one or more operations of FIG. 6 to determine a correct unwrapping tuple. The memory of the computer 20 may also one or more instructions to implement the power distribution controller disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide non-volatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus 23, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 8 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software or firmware instructions for the power distribution controller 810 may be stored in system memory 22 and/or storage devices 29 or 31 and processed by the processing unit 21. Power distribution controller scheme and data may be stored in system memory 22 and/or storage devices 29 or 31 as persistent data-stores.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Some embodiments of the power distribution controller system may comprise an article of manufacture. An article of manufacture may comprise a tangible storage medium to store logic. Examples of a storage medium may include one or more types of computer-readable storage media capable of storing electronic data, including volatile memory or non-volatile memory, removable or non-removable memory, erasable or non-erasable memory, writeable or re-writeable memory, and so forth. Examples of the logic may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. In one embodiment, for example, an article of manufacture may store executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

The power distribution controller system disclosed herein may include a variety of tangible computer-readable storage media and intangible computer-readable communication signals. Tangible computer-readable storage can be embodied by any available media that can be accessed by the power distribution controller system disclosed herein and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. Tangible computer-readable storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other tangible medium which can be used to store the desired information and which can be accessed by the power distribution controller system disclosed herein. In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include signals moving through wired media such as a wired network or direct-wired connection, and signals moving through wireless media such as acoustic, RF, infrared and other wireless media.

An apparatus disclosed herein includes a first power source configured to supply power to a first component and to a second component, a second power source configured to supply power to the second component, and a power distribution controller configured to set an upper limit of current from the first power source to the second component based on average level of charge at the second power source over a predetermined amount of time. In one implementation, the first component is a base of a laptop computer and the second component is a top of the laptop computer. In an alternative implementation, the power distribution controller is further configured to update the upper limit of current on a periodic basis. In another implementation, the power distribution controller is further configured to increase the upper limit of current from the first power source to the second component in response to decline in the average level of charge at the second power source.

In one alternative implementation of the apparatus, the power distribution controller is further configured to decrease the upper limit of current from the first power source to the second component in response to increase in the average level of charge at the second power source. Alternatively, the power distribution controller configured to set an upper limit of current from the first power source to the second component such that current transferred between the first component and the second components is kept substantially equal to average power consumption of the second component. Yet alternatively, the power distribution controller is further configured to update the upper limit of current from the first power source to the second component at any given time t equal to sum of (1) a percentage change in the charge at the second power source in a predetermined time period preceding t multiplied by an empirically determined constant (k) and (2) currently set upper limit of current from the first power source to the second component. In another implementation, the power distribution controller further configured to update the upper limit of current from the first power source to the second component at any given time t equal to sum of (1) a function of percentage change in the charge at the second power source in a predetermined time period preceding t and (2) currently set upper limit of current from the first power source to the second component.

In one implementation of the apparatus, the function is an empirically determined function being at least one of (1) an integrative function, (2) a differential function, (3) a quadratic function, and (4) a log function. In yet another implementation, the power distribution controller is further configured to increase the upper limit of current from the first power source to the second component if the charge level of the second power source is below a first predetermined level. Alternatively, the power distribution controller is further configured to set the first predetermined level to a charge level of the first power source if the charge level of the first power source is below a second predetermined level. Yet alternatively, the power distribution controller configured to set an upper limit of current from the first power source to the second component based on a historical value of charge at the second power source measured at a predetermined historic time.

A method disclosed herein includes determining an average level of charge at a second power source over a predetermined amount of time, the second power source being configured to supply power to a second component and set an upper limit of current from a first power source to the second component based on the average level of charge at a second power source over a predetermined amount of time, the first power source being configured to supply power to a first. An alternative implementation of the method further includes updating the upper limit of current on a periodic basis. Yet another alternative implementation of the method further includes increasing the upper limit of current from the first power source to the second component in response to decline in the average level of charge at the second power source.

An implementation of the method includes decreasing the upper limit of current from the first power source to the second component in response to increase in the average level of charge at the second power source. Another implementation of the method includes setting an upper limit of current from the first power source to the second component such that current transferred between the first component and the second components is kept substantially equal to average power consumption of the second component.

A power distribution controller includes a memory, one or more processing units, and an upper limit determination module stored in the memory and executable by the one or more processor units, the upper limit determination module configured to set an upper limit of current from a first power source to a second component based on average level of charge at a second power source over a predetermined amount of time. In one implementation, the power distribution controller includes a relative change determination module configured to increase the upper limit of current from the first power source to the second component in response to decline in the average level of charge at the second power source. In another implementation of the power distribution controller the relative change determination module is further configured to decrease the upper limit of current from the first power source to the second component in response to increase in the average level of charge at the second power source.

The implementations described herein are implemented as logical steps in one or more computer systems. The logical operations may be implemented (1) as a sequence of processor-implemented steps executing in one or more computer systems and (2) as interconnected machine or circuit modules within one or more computer systems. The implementation is a matter of choice, dependent on the performance requirements of the computer system being utilized. Accordingly, the logical operations making up the implementations described herein are referred to variously as operations, steps, objects, or modules. Furthermore, it should be understood that logical operations may be performed in any order, unless explicitly claimed otherwise or a specific order is inherently necessitated by the claim language. The above specification, examples, and data, together with the attached appendices, provide a complete description of the structure and use of exemplary implementations.

What is claimed is:

1. An apparatus comprising:
   a first power source configured to supply power to a first component and to a second component;
   a second power source configured to supply power to the second component; and
   a power distribution controller configured to set an upper limit of current from the first power source to the second component based on average level of charge at the second power source over a predetermined amount of time,
   wherein the power distribution controller is further configured to set the upper limit of current supplied from the first power source to the second component such that current transferred between the first component and the second components is kept substantially equal to a current corresponding an average power consumption of the second component.

2. The apparatus of claim 1, wherein the first component is a base of a laptop computer and the second component is a top of the laptop computer.

3. The apparatus of claim 1, wherein the power distribution controller is further configured to update the upper limit of current from the first power source to the second component on a periodic basis.

4. The apparatus of claim 1, wherein the power distribution controller is further configured to increase the upper limit of current from the first power source to the second component in response to a decrease in the average level of charge at the second power source.

5. The apparatus of claim 1, wherein the power distribution controller is further configured to decrease the upper limit of current from the first power source to the second component in response to an increase in the average level of charge at the second power source.

6. The apparatus of claim 1, wherein the power distribution controller is further configured to update the upper limit of current from the first power source to the second component at any given time t equal to sum of (1) a percentage change in the charge at the second power source in a predetermined time period preceding t multiplied by an empirically determined constant (k) and (2) currently set upper limit of current from the first power source to the second component.

7. The apparatus of claim 1, wherein the power distribution controller further configured to update the upper limit of current from the first power source to the second component at any given time t equal to sum of (1) a function of percentage change in the charge at the second power source in a predetermined time period preceding t and (2) currently set upper limit of current from the first power source to the second component.

8. The apparatus of claim 7, wherein the function is an empirically determined function being at least one of (1) an integrative function, (2) a differential function, (3) a quadratic function, and (4) a log function.

9. The apparatus of claim 1, wherein the power distribution controller is further configured to increase the upper limit of current from the first power source to the second component if the charge level of the second power source is below a first predetermined level.

10. The apparatus of claim 9, wherein the power distribution controller is further configured to set the first predetermined level to a charge level of the first power source if the charge level of the first power source is below a second predetermined level.

11. The apparatus of claim 1, wherein the power distribution controller is further configured to set an upper limit of current from the first power source to the second component based on a historical value of charge at the second power source measured at a predetermined historic time.

12. A method comprising:
    determining an average level of charge at a second power source over a predetermined amount of time, the second power source being configured to supply power to a second component;
    determining an upper limit of current from a first power source to the second component based on the average level of charge at a second power source over a predetermined amount of time, the first power source being configured to supply power to a first component; and
    limiting current drawn from the first power source to the second component to the upper limit of current from a first power source to the second component.

13. The method of claim 12, further comprising updating the upper limit of current on a periodic basis.

14. The method of claim 12, further comprising increasing the upper limit of current from the first power source to the second component in response to a decrease in the average level of charge at the second power source.

15. The method of claim 12, further comprising decreasing the upper limit of current from the first power source to the second component in response to an increase in the average level of charge at the second power source.

16. The method of claim 12, further comprising determining the upper limit of current from the first power source to the second component such that the current transferred between the first component and the second components is kept substantially equal to a current corresponding an average power consumption of the second component.

17. A power distribution controller comprising:
a memory;
one or more processing units; and
an upper limit determination module stored in the memory and executable by the one or more processor units, the upper limit determination module configured to set an upper limit of current supplied from a first power source to a component based on an average level of charge at a second power source over a predetermined amount of time and update the upper limit of current from the first power source to the second component at any given time t equal to sum of (1) a percentage change in the charge at the second power source in a predetermined time period preceding t multiplied by an empirically determined constant (k) and (2) currently set upper limit of current from the first power source to the second component.

18. The power distribution controller of claim 17, further comprising a relative change determination module configured to increase the upper limit of current from the first power source to the component in response to decline in the average level of charge at the second power source.

19. The power distribution controller of claim 18, wherein the relative change determination module is further configured to decrease the upper limit of current from the first power source to the component in response to increase in the average level of charge at the second power source.

* * * * *